(12) United States Patent
Robinson et al.

(10) Patent No.: US 7,822,712 B1
(45) Date of Patent: Oct. 26, 2010

(54) INCREMENTAL DATA WAREHOUSE UPDATING

(75) Inventors: William Robinson, Mountain View, CA (US); Benjamin Weinberger, San Francisco, CA (US)

(73) Assignee: Google Inc., Mountain View, CA (US)

( * ) Notice: Subject to any disclaimer, the term of this patent is extended or adjusted under 35 U.S.C. 154(b) by 412 days.

(21) Appl. No.: 11/874,668

(22) Filed: Oct. 18, 2007

(51) Int. Cl.
*G06F 17/30* (2006.01)

(52) U.S. Cl. ........................... 707/624; 707/695

(58) Field of Classification Search ............... None
See application file for complete search history.

(56) References Cited

U.S. PATENT DOCUMENTS

| | | | |
|---|---|---|---|
| 6,064,999 A | 5/2000 | Dalal | |
| 6,353,835 B1* | 3/2002 | Lieuwen | 1/1 |
| 6,493,708 B1* | 12/2002 | Ziauddin et al. | 707/3 |
| 6,882,993 B1* | 4/2005 | Lawande et al. | 707/2 |
| 7,010,523 B2 | 3/2006 | Greenfield et al. | |
| 7,139,783 B2* | 11/2006 | Hinshaw et al. | 707/205 |
| 7,181,440 B2 | 2/2007 | Cras et al. | |
| 7,266,549 B2 | 9/2007 | de Souza et al. | |
| 7,440,969 B2 | 10/2008 | Schmitt | |
| 7,469,241 B2 | 12/2008 | Bellamkonda et al. | |
| 7,523,124 B2 | 4/2009 | Lavdas et al. | |
| 7,580,944 B2 | 8/2009 | Zhuge et al. | |
| 2002/0194163 A1 | 12/2002 | Hopeman et al. | |
| 2003/0036809 A1 | 2/2003 | Landman et al. | |
| 2003/0083925 A1 | 5/2003 | Weaver et al. | |
| 2005/0060300 A1 | 3/2005 | Stolte et al. | |
| 2005/0235001 A1* | 10/2005 | Peleg et al. | 707/200 |
| 2006/0047696 A1* | 3/2006 | Larson et al. | 707/103 R |
| 2006/0122964 A1* | 6/2006 | Yu et al. | 707/2 |
| 2006/0168515 A1 | 7/2006 | Dorsett et al. | |
| 2006/0224564 A1* | 10/2006 | Yu et al. | 707/2 |
| 2007/0226264 A1* | 9/2007 | Luo et al. | 707/200 |
| 2008/0040382 A1 | 2/2008 | Morris et al. | |
| 2008/0148367 A1 | 6/2008 | Hilerio et al. | |
| 2009/0019005 A1* | 1/2009 | Hu et al. | 707/3 |
| 2009/0100336 A1 | 4/2009 | Powley et al. | |

OTHER PUBLICATIONS

Sachin Kulkarmo et. al, "Concurrent Maintenance of Views Using Multiple Versions", Aug. 2, 2004, pp. 1-6.*

"Choosing the Attributes for the Dimension Tables" *IBM Informix Database Design and Implementation Guide* [online] Nov. 2, 2005 <URL: http://publib.boulder.ibm.com/infocenter/idshelp/v10/index.jsp? topic=/com.ibm.ddi.doc/ddi232.htm> [retrieved Aug. 6, 2009], 2 pages.

(Continued)

*Primary Examiner*—Debbie Le
(74) *Attorney, Agent, or Firm*—Fish & Richardson P.C.

(57) ABSTRACT

Processes, systems and computer programs for data management. New fact data is received, e.g., at a data warehouse, and the new fact data is aggregated to incrementally update a first version of a materialized view (a pre-computed aggregation of data), the updated materialized view being a second version of the materialized view. While aggregating the new data, the first version of the materialized view is provided for serving by a query subsystem. After aggregating the new data to the materialized view, the second version of the materialized view is provided for serving by the query subsystem thereafter. At least one version of the materialized view is available for serving by the query subsystem even during aggregation.

14 Claims, 4 Drawing Sheets

OTHER PUBLICATIONS

"The Dimension Tables" IBM Red Brick Warehouse 6.3 Information Center, IBM Corp [online] Mar. 2004 <URL: http://publib.boulder.ibm.com/infocenter/rbhelp/v6r3/index.jsp?topic=/com.ibm.redbrick.doc6.3/ssg/ssg14.htm> [retrieved Aug. 6, 2009], 2 pages.

"Distributed Hash Table" Wikipedia [online] Jun. 10, 2007 <URL: www.en.wikipedia.org/wiki/Distriblited_hash_table> [retrieved Jun. 12, 2007], 5 pages.

Fan, Hao et al., "Using AutoMed Metadata in Data Warehousing Environments," DOLAP 2003, ACM Sixth International Workshop on Data Warehousing and OLAP, New Orleans, Louisiana, USA, Nov. 7, 2003, Proceedings, Retrieved from the Internet, URL:<http://www.dcs.bbk.ac.uk/~ap/pubs/dolap03.pdf>, 8 page.

Forsman, Sarah, "OLAP Council White Paper" [online] 1997 <URL: http://www.symcorp.com/downloads/OLAP_CouncilWhitePaper.pdf> [retrieved Aug. 6, 2009], 5 pages.

"Java Programming: Section 12.3 (Map Classes)" Internet FAQ Archive [online] <URL:http://72.14.253.104/search?q=cache:VxilWYuu5ncJ:www.faqs.org/docs/javap/c12/s3.html> [retrieved Jun. 12, 2007], 7 pages.

Kimball, Ralph et al., *The Data Warehouse Toolkit Second Edition* (1996), John Wiley and Sons, Inc., ISBN 0-471-20024-7, Chapter 1, pp. 1-19.

"Logical Design in Data Warehouses" *Oracle9i Data Warehousing Guide*, Release 2 (9.2) [online] <URL: http://download.oracle.com/docs/cd/B10501_01/server.920/a96520/logical.htm> [retrieved Mar. 23, 2009], 6 pages.

"OLAP Cube" Wikipedia, the Free Encyclopedia [online]Apr. 24, 2007 <URL: www.en.wikipedia.org/wiki/OLAP_cube>, [retrieved May 15, 2007], 3 pages.

Pike, R. et al. "Interpreting the Data: Parallel Analysis With Sawzall" *Scientific Programming*, vol. 13, No. 4 (2005), pp. 277-298.

Vaisman, Alejandro et al., "A Temporal Query Language for OLAP: Implementation and a Case Study" *DBPL 2001*. Rome, Italy, Sep. 2001, pp. 78-96.

Weir, Rob et al., "Best Practice for Implementing a Data Warehouse: A Review for Strategic Alignment" *DMDW 2003*, Berlin, Germany [online] <URL: http://sunsite.informatik.rwth-aachen.de/Publications/CEUR-WS/Vol-77/05_Weir.pdf> [retrieved Aug. 6, 2009], 14 pages.

USPTO, First Action Interview Pilot Program Communication for U.S. Appl. No. 11/874,622, May 27, 2010, 27 pages.

* cited by examiner

INCREMENTAL DATA WAREHOUSE UPDATING

TECHNICAL FIELD

This invention relates to data warehousing.

BACKGROUND

A data warehouse can receive new fact data continually, in batches, periodically or sporadically. A data warehouse client may require aggregation of the new fact data, for example, to generate reports or other meaningful information from the raw data. Accordingly, calculating aggregated values must occur periodically to account for the receipt of new data, or occur at query time. Conventional large data warehouses support bulk updating, e.g., performed once daily. However, since data in the data warehouse is only as fresh as the most recent bulk update, performing a bulk update once daily adversely affects data freshness. Additionally, during the bulk update, query responses to queries to the data warehouse are often slow or non-existent. Furthermore, conventional large data warehouses may support incremental maintenance of some aggregated values, however, only in certain contrived, special cases and with a significant query performance penalty.

SUMMARY

This invention relates to data management. In general, in one aspect, the invention features processes, systems and computer programs wherein new fact data is received, and the new fact data is aggregated to incrementally update a first version of a materialized view (a pre-computed aggregation of data), the updated materialized view being a second version of the materialized view. While aggregating the new data, the first version of the materialized view is provided for serving by a query subsystem. After aggregating the new data to the materialized view, the second version of the materialized view is provided for serving by the query subsystem thereafter. At least one version of the materialized view is available for serving by the query subsystem even during aggregation.

Implementations of the invention can include one or more of the following features. The new data can include a set of files, and after aggregating the new data, one or more of the files can be marked as available in the second version of the materialized view for serving by the query subsystem. The second version of the materialized view can include the one or more marked files including the new data and a file of previously aggregated data. In response to a query for data included in the second version of the materialized view, the file of previously aggregated data can be merged with the one or more marked files including new data. The file of previously aggregated data can be periodically merged with files including new data that updated the materialized view since the last such periodic merger. A materialized view can be implemented as a view map storing a set of records, each record being a key-value pair. In one example, the view map is a non-locking aggregating distributed map.

An aggregation map can be provided that maps from keys included in key-value pairs associated with data at a first level in a hierarchy to keys included in key-value pairs associated with data at a second level in a hierarchy to which data in the first level can be aggregated. Aggregating the new data can include applying the aggregation map to map the new data to the first version of the materialized view. In one example, the aggregation map is a distributed in-memory-map.

A unique identifier can be assigned to the new data. The unique identifier can be associated with the second version of the materialized view to record that the new data has been aggregated to the materialized view.

In general, in another aspect, the invention features a data warehouse system including an offline aggregation system, a data store and a query subsystem. The offline aggregation system can be configured to receive new data and aggregate the new data to incrementally update a first version of a materialized view (a pre-computed aggregation of data). The updated materialized view being a second version of the materialized view. The offline aggregation system can be further configured to, while aggregating the new data, provide the first version of the materialized view for serving by a query subsystem. After aggregating the new data to the materialized view, the offline aggregation system can provide the second version of the materialized view for serving by the query subsystem thereafter. At least one version of the materialized view remains available for serving by the query subsystem even during aggregation. The data store is configured to receive updates to materialized views from the offline aggregation system and configured to provide data included in materialized views to the query subsystem. The query subsystem is configured to serve data from the first version of the materialized view before aggregation of the new data and to serve data from the second version of the materialized view after aggregation.

Implementations of the invention can realize none, one or more of the following advantages. A data warehouse can be incrementally updated without degrading query performance. By providing an offline aggregation system that can operate in parallel with a query system, data can be updated even during high-query times of day, allowing for frequent updating and improved data freshness.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Techniques, computer programs and a system for aggregating data are described. Typically, a data warehouse is continually or periodically receiving new fact data. The new data can be of varying levels of granularity, but is typically at the lowest granular level. Aggregating data can include aggregating data from a first level in a hierarchy (referred to herein as a "drilldown level") to a second level in the hierarchy (referred to herein as a "rollup level").

Figure 1:
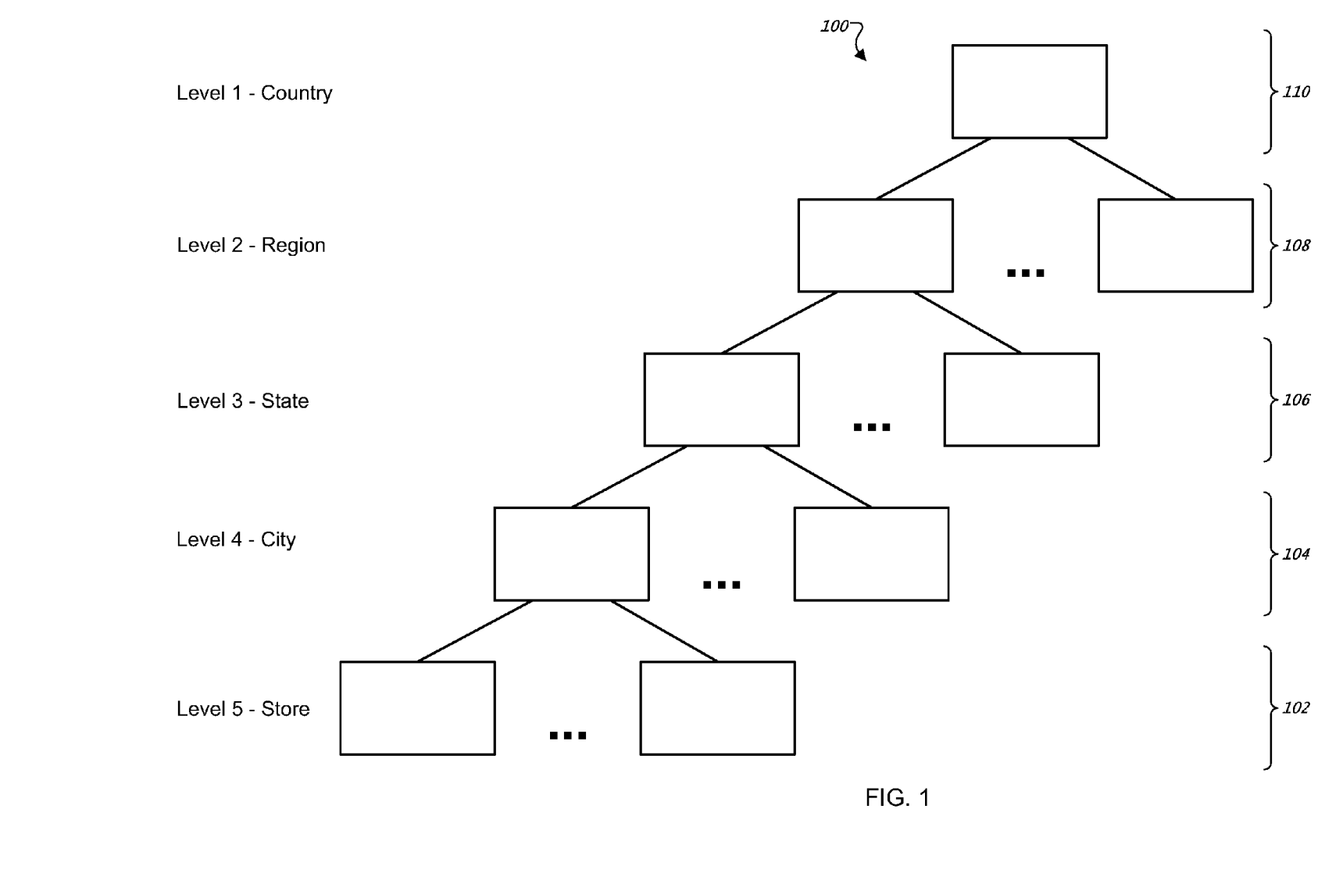
FIG. 1 is an example block diagram of a data hierarchy.

Referring to FIG. 1, an illustrative example of a hierarchy of data 100 is shown. This illustrative example shall be used to further explain the techniques and systems described herein. However, it should be understood that a hierarchy can be of a different configuration, and this is but one illustrative example. In this example, the data to be housed and aggregated relates to sales data for stores. Each store has a store identifier (ID) and is in level 5 102 of the example hierarchy. Each store is located in a city, and the cities each have a city ID and are in level 4 104 of the hierarchy. Each city is located within a state, and each state has a state ID and is in level 3 106. Each state is included in a region, e.g., "Western USA", and each region has a region ID and is in level 2 108. Each region is located within a country, and each country has a country ID and is in level 1 110 of the hierarchy.

Figure 2:
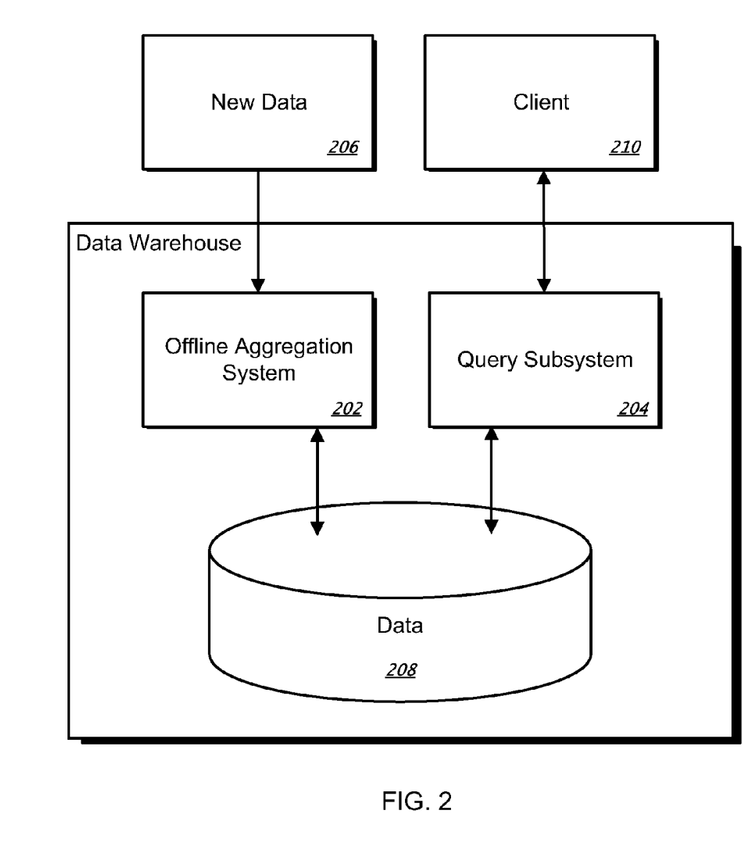
FIG. 2 is an example block diagram of a data warehousing system.

If an aggregation system (such as offline aggregation system 202, described in reference to FIG. 2) is aggregating data from the store level 102 to the city level 104, the store level 102, i.e., level 5, is the drill-down level and the city level 104, i.e., level 4, is the roll-up level. That is, sales data from the store level is "rolled-up" to the city level. The aggregation map therefore maps store IDs from level 5 to city IDs in level 4. A materialized view refers to a pre-computed aggregation of fact data values. For example, a materialized view can be a pre-computed aggregation of sales revenue for all stores located in a certain city. Computing the aggregation requires rolling up the sales revenue values for the stores included in level 5 that are mapped to the certain city included in level 4. An un-materialized view refers to a possible roll-up, e.g., from the store level 102 to the state level 106, for which a computed aggregation does not pre-exist; an un-materialized view may be generated upon a specific request, for example.

In certain circumstances, for example, where a data warehouse is dealing with significantly large volumes of data, performing a conventional bulk update, e.g., once daily, is not practical and can have significant adverse effects on query response performance and data freshness. The techniques, methods, apparatus, computer programs and systems described herein provide for a series of data updates to a data warehouse without degrading query performance and or freshness. Referring to FIG. 2, an example data warehousing system 200 is provided that includes two subsystems: an offline aggregation subsystem 202 and a query subsystem 204. The offline aggregation subsystem 202 can continually process incoming new data 206 and aggregate the new data to materialized views within the data warehousing system 200. In some implementations, the data warehousing system 200 includes an online analytical processing (OLAP) system to process data. One example of the OLAP system is a Datacube system of Google, Inc. in Mountain View, Calif.

The query subsystem 204 serves queries using an available version of the data 208. Periodically, the query subsystem 204 is "refreshed" by incorporating new data processed most recently by the offline aggregation system 202. In one implementation, refreshing the query subsystem 204 means indicating to the query subsystem 204 that new data has been aggregated to one or more materialized views and is now available for serving. The incremental new data is thereafter merged with previously existing data 208 and can be served in response to a query. Therefore, before the aggregation of new data is complete, the query subsystem 204 has a first version of a materialized view available for serving. After aggregation of the new data is completed by the offline aggregation subsystem 202, a second version of the materialized view is available for serving. Accordingly, at all times some version of the materialized view is available for serving by the query subsystem 204. The aggregation subsystem 202 is "offline" in that aggregation can occur in parallel to the query subsystem 204 responding to queries, such as queries originating from client 210, and there is no degradation in query performance while aggregation is ongoing. Aggregation can occur on a frequent, incremental basis-therefore providing the query subsystem 204 with relatively fresh data.

In one implementation, the query subsystem 204 includes a query engine and the data 108 includes a fact subsystem and a dimension subsystem. The fact subsystem stores incremental records describing events (e.g., retail purchase orders, banking transactions) that are not typically modified at a later time, while the dimension subsystem stores data describing entities (e.g., customer contact information, product descriptions) that can change over time. The query engine queries both the fact subsystem and the dimension subsystem to fulfill query requests. The fact subsystem and the dimension subsystem can be implemented within one or more storage devices. In some implementations, the fact subsystem and the dimension subsystem are contained within separate computing devices such as networked servers. The query engine in this example can be included within one of the networked devices hosting the fact subsystem or the dimension subsystem, or the query engine can be implemented within a third computing device, such as a client computer. In some implementations, the fact subsystem, the dimension subsystem and the query engine are implemented within the same computing device. Copies of the fact subsystem and/or the dimension subsystem can be replicated across multiple storage devices and/or multiple computer devices. The query engine can, similarly, be placed within many computer devices. For example, many client devices in different locations, e.g., client 110, such as regional offices of a national corporation, can include the query engine for accessing the fact subsystem and the dimension subsystem.

Figure 3:
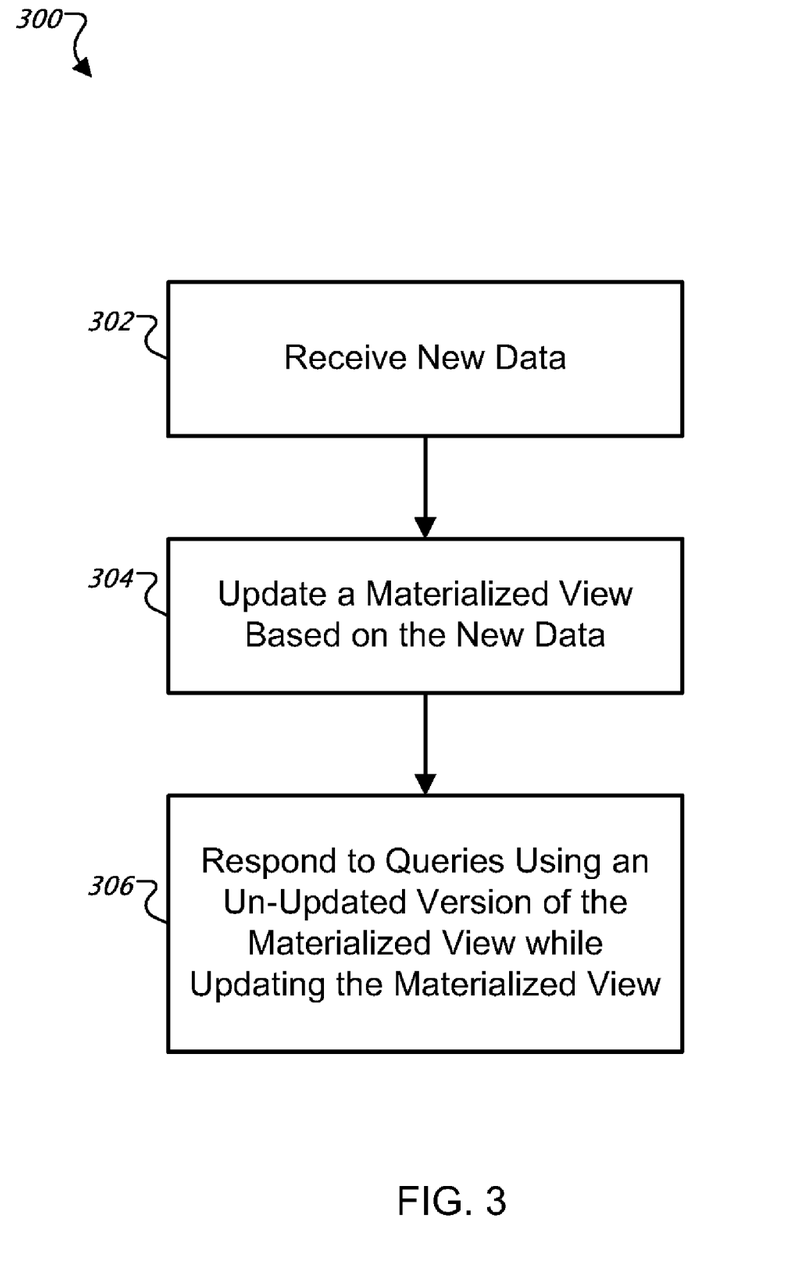
FIG. 3 is a flow chart showing an example process for incrementally updating data.

Referring to FIG. 3, a process 300 is shown for incremental updating data in a data warehouse. The data warehouse can be continually or periodically receiving new data. In one implementation, incoming new data is batched every predetermined time interval (e.g., every 15 minutes or every hour), the new batch referred to herein as a "delta". The new data is received/identified (e.g., by the data warehouse) (Step 302). By way of non-limiting example, for clarity, examples are described in reference to the system shown in FIG. 2. However, it should be understood that other systems can be configured in different ways and implement the processes described herein. Referring to the example system 200 in FIG. 2, the delta of new data is received by the offline aggregation system 202 included in the data warehousing system 200. In one example, the delta is a set of files and upon receipt the set of files is read.

The new data included in the delta is aggregated to incrementally update a first version of a materialized view (Step 304). The updated materialized view is referred to herein as a second version of the materialized view. While aggregating the new data to update the materialized view, the first version of the materialized view is available for serving by a query subsystem. After aggregating the new data to the materialized view, the second version of the materialized view is made available for serving (e.g., by the query subsystem) (Step 306). For example, after the offline aggregation system 202 aggregates the delta to the materialized view, and thereafter the delta is marked as available for serving by the query subsystem 204. Each materialized view updated with the new data is marked as being updated by the delta, to avoid duplication of aggregation. At least one version of the materialized view remains available for serving by the query subsystem 204 even during aggregation.

By way of illustrative example, and referring again to FIG. 1, consider a data warehouse that includes sales revenues for some number of stores. The stores can periodically transmit data to the data warehouse corresponding to new sales revenues figures. For example, store ID 2301 generates $1,000 in sales revenue over a predetermined period of time (e.g., an hour). After a certain amount of time has elapsed, which can be different than the time interval over which the data was collected, the sales revenue figure (i.e., the $1,000), is transmitted by the store and received by the offline aggregation system 202 of the data warehouse system 200.

Accordingly, in this example, the level of granularity of the data received is level 5 in the data hierarchy 100 shown in FIG. 1. However, a data warehouse client may be interested in a report that includes the aggregated sales revenue for the city in which the store is located. For example, consider that store 2301 is located in Redwood City, Calif. To generate a report or respond to a query for the sales revenue of all stores located in Redwood City, the sales revenue data from level 5, i.e., the store level 102, is rolled-up to the sales revenue data in level 4, i.e., the city level 104. The offline aggregation system 202 can aggregate the received information with pre-existing information.

In one implementation, the new data is received as multiple records, where each record is a key-value pair. In the current example, the value in the pair is the sales revenue figure, i.e., $1000, and the key is the store ID, i.e., 2301. In other examples, depending on the nature of the data received and the level of granularity, the key can include a date, a product sold, other identifying values, or combinations thereof. In one implementation, the offline aggregation system 202 can examine each key in the new data and roll-up the data to a corresponding relevant key in one or more materialized views. For example, the offline aggregation system 202 can examine the store ID being 2301 to determine which city in level 4 the store corresponds to, and therefore aggregate the new sales revenue to the appropriate materialized view. To determine from the key the appropriate materialized view, a mapping from a first level in the hierarchy, i.e., a drill down level, to a second level in the hierarchy, i.e., the roll-up level, can be used (referred to herein as a "aggregation map").

In the current example, the aggregation map specifically includes a mapping from the key representing the dimension "store ID", i.e., store ID 2301 to a corresponding key representing the dimension "city", i.e., Redwood City. For example, if stores in Redwood City had previously generated $10,000 in sales revenue, the $1,000 delta from store ID 2301 can be added to that amount, generating a new aggregated amount of $11,000.

In one implementation, the aggregation map is a distributed map that specifies a mapping between the drill down level, e.g., the store level 102 (i.e., level 5), and the roll-up level, e.g., the city level 104 (i.e., level 4). The distributed map can be partitioned into multiple portions. The portions can be stored on multiple storage systems. Partitioning the mapping information, i.e., the aggregation map, allows for aggregation mapping of large volumes of data and/or sparse data. That is, if a conventional aggregation map, such as an array, is used to map large volumes of data, one machine may be unable to store and effectively manage the aggregation map. Partitioning the map, which allows for the aggregation map to be stored across multiple machines, removes limitations on the size of the aggregation map.

In one implementation, the distributed map is an in-memory-map distributed across multiple machines, which can improve response time. In another implementation, the distributed map is implemented as distributed disk-based maps across multiple machines, which can increase per-machine capacity.

In some implementations, the distributed map is partitioned into substantially similar sized portions. For example, a distributed map can have n portions where each portion includes $1/n^{th}$ of the distributed map. In some implementations, the portions can be implemented as one or more portions of a distributed hash table that can be used to hash the mapping data stored by the distributed map. Moreover, the data can be hashed in such a way that allows an aggregation server to determine where the data resides. In one implementation, the ID corresponding to a dimension level can be parsed and used to determine which portion of the distributed map contains the mapping information. For example, the last two digits "01" of the store ID 2301 can be used to specify a portion of the distributed map that includes the corresponding roll-up mapping within the distributed map.

In some implementations, the map portions are replicated across more than one machine. This approach can reduce the latency of aggregation requests. For example, if more than one machine includes a portion of the map, then if a machine is busy processing a previous aggregation request, other machines are available to process new aggregation request on the same map portions.

In some implementations, the distributed map can be periodically recreated to include new data. For example, a new store can be added to the data warehousing system. The corresponding new store ID and mapping information to other data included in a data hierarchy can be added to the map. For example, the drilldown level store ID for the store can be mapped to a corresponding city ID, state ID, region ID and country ID, or other roll-up levels, to name a few examples. In some implementations, the distributed map can be recreated by loading a file that specifies the information in the distributed map and the information stored in the various partitions.

In one implementation, during the aggregation, each delta is tracked individually to ensure that it is aggregated only once with pre-existing data. For example, the offline aggregation system 202 can assign a unique identifier to the received deltas and associate the unique identifier to the materialized views to record that the delta has been aggregated to the one or more materialized views, as appropriate.

As the offline aggregation system 202 aggregates data upon receipt of one or more deltas, the query subsystem 204 remains responsive to queries. For example, the query subsystem 204 can receive a query request from a client 210. Client 210 can be a human operated computing system, or an autonomous computing system, to name two examples. The query subsystem 204 can query a version of the data 208 that may or may not currently include the new data 206. Periodically, deltas are made available to query subsystem 204. This allows the query subsystem 204 to present the updated-aggregated data in response to queries. For example, the system 200 can maintain a set of state variables that specify if a particular delta is available in a materialized view.

In one implementation, a materialized view is implemented as a non-locking distributed map (referred to herein as a "view map"). The view map can store a set of records, each record being a key-value pair. In some implementations, the key is a composite key, i.e., includes more than one dimension and the composite key is a set of keys. A pre-computed aggregated value, e.g., a pre-computed aggregation of sales revenues for all stores in Redwood City, can be stored as a record, where the key corresponds to an ID for Redwood City, and the value corresponds to the pre-computed aggregated value.

Further, the view map can be used to maintain the state of deltas as they are aggregated. The view map has an associated data structure including a list of deltas that the view map contains. The list can be updated transactionally with the view map. For example, new fact data from a delta can be added to the view map and the delta can then be denoted as available in the view map.

In one implementation, the aggregated data is stored in more than one file, at least temporarily. For example, if the sales revenue figure for Redwood City is $10,000 in a materialized view, and a delta including a new sales revenue figure, e.g., for store ID 2301, of $1000 is received, a data file including the $1000 record is stored with an existing file including the $10,000 previously aggregated value. When a query calls for data from the materialized view for sales revenue for Redwood City, the view map, i.e., the non-locking aggregating distributed map, automatically retrieves both files, sums them (i.e., merges them) and reports the sum as the query result, i.e., $11,000. Moreover, in some implementations, the files are periodically merged, i.e., the files containing the values $10,000 and $1000 become a single file including the value $11,000. However, merging is not necessarily done every time a delta updates a view; for example, merging can be done at a less frequent interval (e.g., every 15 minutes, once an hour or daily). In one implementation, the "second version" (i.e., updated version) of a materialized view is the first version of the materialized view together with the deltas aggregated to the materialized view since the last merging of data files.

As discussed, the system 200 can aggregate data in an offline fashion; the system 200 can thereby avoid a read-modify-write loop. Typically, a read-modify-write loop is used to achieve data integrity. In general, a read-modify-write loop includes three steps: reading the data, modifying the data, and writing the data back to the location from which it was read. Because systems that employ a read-modify-write loop do not want more than one object or operation to be modifying data concurrently, locks (e.g., semaphores, or state flags) are used to ensure that only one object or operation has access to the data at any one time. However, when data is "locked" it is not available for responding to queries, and degrades query performance. Updating can occur during "off hours", when querying is at a low, however, data freshness is therefore compromised due to delays in data updating.

In the system and techniques described herein, the read-modify-write loop can be avoided, because the aggregating system 202 aggregates the data to generate a second version of a materialized view, while the query subsystem 204 queries a first version of the materialized view. In this sense, a view map is "non-locking", i.e., a version of the data is always available for responding to queries.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 4:
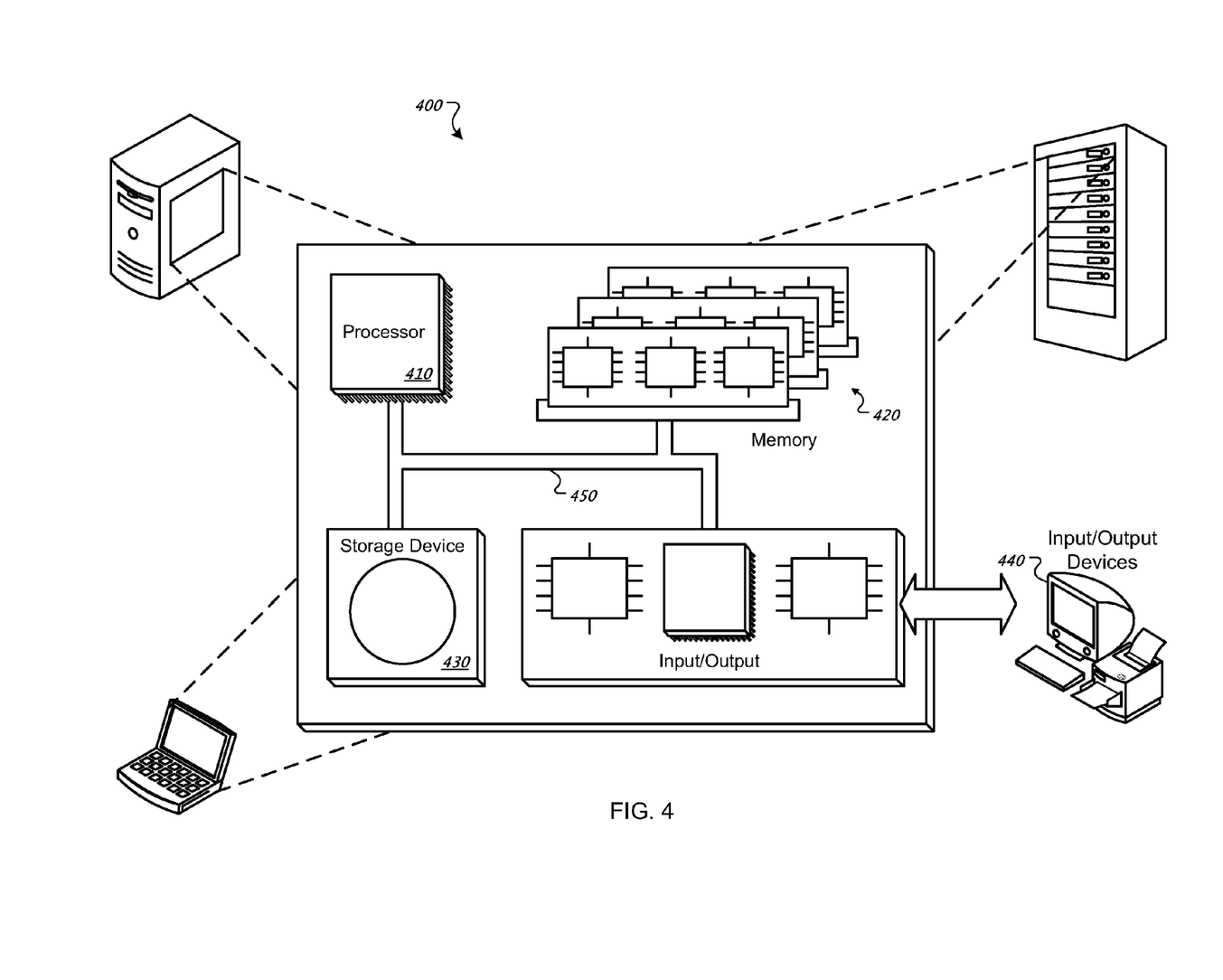
FIG. 4 is a schematic diagram of an example computer system.

Referring now to FIG. 4, a schematic diagram of an example computer system 400 is shown. The system 400 can be used for the operations described in association with the process 300 shown in FIG. 3, according to one implementation. For example, one or more of the systems 400 can be used to implement a server hosting an offline aggregation system 202, a query subsystem 204, a database storing data 208 and/or a client 210 (see FIG. 2).

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440. In some embodiments, a parallel processing set of systems 400 connected over a network may be employed, clustered into one or more server centers.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 includes a keyboard and/or pointing device. In another implementation, the input/output device 440 includes a display unit for displaying graphical user interfaces.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method comprising:

receiving new data that comprises a set of files;

aggregating the new data to incrementally update a first version of a materialized view to generate a second version of the materialized view, wherein the materialized view comprises a pre-computed aggregation of data;

while aggregating the new data, providing the first version of the materialized view for serving by a query subsystem;

after aggregating the new data to the first version of the materialized view, providing the second version of the materialized view for serving by the query subsystem thereafter and marking one or more of the files of the set of files as available in the second version of the materialized view for serving by the query subsystem, wherein the second version of the materialized view includes the one or more marked files including new data and a file of previously aggregated data; and in response to a query for data included in the second version of the materialized view, merging the file of previously aggregated data and the one or more marked files including new data;

wherein the first version of the materialized view remains available for serving by the query subsystem even during aggregation and the second version of the materialized view is available thereafter.

2. The method of claim 1, further comprising:

periodically merging the file of previously aggregated data with files including new data that updated the materialized view since the last such periodic merger.

3. The method of claim 1, wherein a materialized view comprises a view map storing a set of records, each record being a key-value pair.

4. The method of claim 3, wherein the view map comprises a non-locking aggregating distributed map.

5. The method of claim 3, further comprising:

providing an aggregation map that maps from keys included in key-value pairs associated with data at a first level in a hierarchy to keys included in key-value pairs associated with data at a second level in a hierarchy to which data in the first level can be aggregated;

wherein aggregating the new data comprises applying the aggregation map to map the new data to the first version of the materialized view.

6. The method of claim 5, wherein the aggregation map comprises a distributed map.

7. The method of claim 1, further comprising:

assigning a unique identifier to the new data;

associating the unique identifier to the second version of the materialized view to record that the new data has been aggregated to the materialized view.

8. A system comprising:

a processor;

a storage device coupled to the processor and configurable for storing instructions, which, when executed by the processor, cause the processor to perform operations comprising:

receiving new data that comprises a set of files;

aggregating the new data to incrementally update a first version of a materialized view to generate a second version of the materialized view, wherein the materialized view comprises a pre-computed aggregation of data;

while aggregating the new data, providing the first version of the materialized view for serving by a query subsystem;

after aggregating the new data to the first version materialized view, providing the second version of the materialized view for serving by the query subsystem thereafter and marking one or more of the files of the set of files as available in the second version of the materialized view for serving by the query subsystem, wherein the second version of the materialized view includes the one or more marked files including new data and a file of previously aggregated data; and in response to a query for data included in the second version of the materialized view, merging the file of previously aggregated data and the one or more marked files including new data;

wherein the first version of the materialized view remains available for serving by the query subsystem even during aggregation and the second version of the materialized view is available thereafter.

9. A computer readable medium having instructions stored thereon, which, when executed by a processor, cause the processor to perform operations comprising:

receiving new data that comprises a set of files;

aggregating the new data to incrementally update a first version of a materialized view to generate a second version of the materialized view, where the materialized view comprises a pre-computed aggregation of data;

while aggregating the new data, providing the first version of the materialized view for serving by a query subsystem;

after aggregating the new data to the first version of the materialized view, providing the second version of the materialized view for serving by the query subsystem thereafter and marking one or more of the files of the set of files as available in the second version of the materialized view for serving by the query subsystem, wherein the second version of the materialized view includes the one or more marked files including new data and a file of previously aggregated data; and in response to a query for data included in the second version of the materialized view, merging the file of previously aggregated data and the one or more marked files including new data;

wherein the first version of the materialized view remains available for serving by the query subsystem even during aggregation and the second version of the materialized view is available thereafter.

10. The computer readable medium of claim 9, the instructions further operable to cause the processor to perform operations comprising:

periodically merging the file of previously aggregated data with files including new data that updated the materialized view since the last such periodic merger.

11. The computer readable medium of claim 9, wherein a materialized view comprises a view map storing a set of records, each record being a key-value pair.

12. The computer readable medium of claim 11, wherein the view map comprises a non-locking aggregating distributed map.

13. The computer readable medium of claim 11, the instructions further operable to cause the processor to perform operations comprising:

providing an aggregation map that maps from keys included in key-value pairs associated with data at a first level in a hierarchy to keys included in key-value pairs associated with data at a second level in a hierarchy to which data in the first level can be aggregated;

wherein aggregating the new data comprises applying the aggregation map to map the new data to the first version of the materialized view.

14. The computer readable medium of claim 13, wherein the aggregation map comprises a distributed map.

* * * * *